(12) United States Patent
Basturk

(10) Patent No.: US 7,388,831 B2
(45) Date of Patent: Jun. 17, 2008

(54) METHOD AND APPARATUS FOR BOND MANAGEMENT ACCORDING TO HIERARCHY

(75) Inventor: Erol Basturk, Cupertino, CA (US)

(73) Assignee: Pluris, Inc., Cupertino, CA (US)

( * ) Notice: Subject to any disclaimer, the term of this patent is extended or adjusted under 35 U.S.C. 154(b) by 1039 days.

(21) Appl. No.: 10/079,984

(22) Filed: Feb. 20, 2002

(65) Prior Publication Data

US 2002/0114276 A1    Aug. 22, 2002

Related U.S. Application Data

(63) Continuation-in-part of application No. 09/625,747, filed on Jul. 26, 2000, now Pat. No. 6,553,005.

(51) Int. Cl.
*H04L 12/26* (2006.01)
*H04L 12/56* (2006.01)

(52) U.S. Cl. .............. 370/230; 370/285; 370/349; 370/389; 370/402; 370/463

(58) Field of Classification Search ........ 370/229–232, 370/235, 236, 401, 468, 349, 389, 394, 402, 370/463
See application file for complete search history.

(56) References Cited

U.S. PATENT DOCUMENTS

| | | | |
|---|---|---|---|
| 5,095,480 A * | 3/1992 | Fenner | 370/238 |
| 5,276,848 A * | 1/1994 | Gallagher et al. | 711/121 |
| 5,491,694 A * | 2/1996 | Oliver et al. | 370/455 |
| 5,509,123 A * | 4/1996 | Dobbins et al. | 709/243 |
| 5,550,816 A * | 8/1996 | Hardwick et al. | 370/397 |
| 5,751,971 A * | 5/1998 | Dobbins et al. | 709/238 |
| 5,999,525 A | 12/1999 | Krishnaswamy et al. | |
| 6,058,431 A * | 5/2000 | Srisuresh et al. | 709/245 |
| 6,078,586 A * | 6/2000 | Dugan et al. | 370/395.2 |
| 6,278,714 B1 | 8/2001 | Gupta | |
| 6,385,209 B1 * | 5/2002 | Skirmont et al. | 370/419 |
| 6,553,005 B1 * | 4/2003 | Skirmont et al. | 370/285 |
| 6,691,129 B2 * | 2/2004 | Ahmadi | 707/102 |

FOREIGN PATENT DOCUMENTS

| | | |
|---|---|---|
| WO | WO 01/05101 A | 1/2001 |
| WO | WO 01/65777 A | 9/2001 |

* cited by examiner

*Primary Examiner*—Edan Orgad
*Assistant Examiner*—Venkatesh Haliyur
(74) *Attorney, Agent, or Firm*—Central Coast Patent Agency, Inc.

(57) ABSTRACT

In a communication system having a plurality of physical communication ports, a hierarchical bond communication interface has a logical interface as a component of the bond at a top level of the hierarchy, and a first subjugate logical interface at a second level of the hierarchy as a component of the top-level logical interface. The communication system has a control mechanism whereby thresholds may be set to determine up or down status of hierarchical bonds for use in communication, according to characteristics of components of the bonds.

31 Claims, 11 Drawing Sheets

METHOD AND APPARATUS FOR BOND MANAGEMENT ACCORDING TO HIERARCHY

CROSS-REFERENCE TO RELATED DOCUMENTS

The present application is a continuation in part (CIP) of a U.S. patent application Ser. No. 09/625,747 entitled "Method and Apparatus for Load Apportionment Among Physical Interfaces in Data Routers" filed on Jul. 26, 2000, now U.S. Pat. No. 6,553,005 which is related to a co-pending U.S. patent application Ser. No. 09/594,300 filed on Jun. 14, 2000, which is titled "Method and Apparatus for Mapping Data Packets Between Lines of Differing Capacity at a Router Interface", the disclosure of which is incorporated by reference.

FIELD OF THE INVENTION

The present invention is in the field of data-packet processing and forwarding over a data-packet-network, and pertains particularly to methods and apparatus for aggregating physical links between routers into one or more virtual interfaces, and manipulating such aggregations according to a hierarchical data structure.

BACKGROUND OF THE INVENTION

The growth and development of the public network known as the Internet is a very well-known phenomenon. The Internet has grown very rapidly both in terms of end users and content providers. This phenomenal growth has generated a great need for improved hardware and software for handling the greatly increased data traffic.

Hardware-software systems known as routers are the workhorses of the Internet. In current art most routers are capable of handling traffic at rates in the gigabit per second range. The present inventors are engaged in developing Terrabit network routers, and in proposing and developing solutions for problems inherent in current art routing systems.

As is well-known in the art, there are several different kinds of packets to be routed in Internet traffic. One type of packet is termed in the art an IP packet. IP packets can be used for all-types of data; including Internet telephony and Internet video streaming. IP packets have header fields defining such as the source and destination for each packet.

In the art of packet routing it is well-known that it is desirable for packets to arrive at a destination in the same order that they were generated at a source. For one reason, out-of-order packets may well cause dropouts in applications such as voice and video communication and the like. Provision may well be made at a destination to re-order packets, but such re-ordering is expensive in processor resources. Such provision is commonly not made, and packets may be lost or discarded in any case.

If there were to be only one hop from a source to a destination, this would not be problem. Since there are invariably several machines through which packets must pass and be processed, and because newer and better routers may employ processing parallelism, attention must be paid to the order of packets.

The packets handled by a router can be logically divided into flows, where each flow is the set of all packets, which are being sent from the same origin to the same destination. A group of such flows can be treated as a single flow. Generally speaking, if packets in the same flow are always sent from every system in the order that they were received, the original ordering will be honored.

A method is known to the inventor for internal routing of a packets received in a packet router. The method comprises steps of selecting a logical interface having multiple physical ports as a destination for the packet, processing any one or more addresses or labels of the packet and other packets received by a common function, producing thereby results unique to the packets in which the addresses and labels processed differ, and then mapping the physical ports at the destination to the unique results produced by processing the addresses or labels of packets, and finally routing the data packet according to the computed mapping. Weighting is applied to the physical ports in the mapping scheme, the weighting reflecting different transmission capacities of the physical ports.

The Internet network is divided logically into various standard layers of differing hardware and software functionality. In consulting one standard and well-known layering protocol termed Open System Interconnection (OSI). There are, according to this scheme, seven distinct network layers. Network layers amount to separated levels of network function. The well-known International Organization for Standardization (ISO) and the International Telecommunication Union-Telecommunication Standardization Sector (ITU-T) brought about the OSI architecture. Specific details regarding protocols and functions associated with OSI layers are published and available. The focus of this specification concentrates on function of two of the lower layers pertinent to the present invention.

The two layers of most concern in establishing physical data links and logical routing interfaces are layers 2 and 3. Layer 2 controls the physical layer or layer 1 data flow. Layer 2 is responsible for establishing link connections between workstations. Layer 3 addresses and routes packets. Layer 3 is responsible for such as addressing and control functions. Layer 3 manages routing function including packet switching, routing, data congestion, and translation of logical addresses to physical addresses. There are also other known and standardized architectures defining different numbers and descriptions of network layers. Among these architectures however, layers 1-3 are essentially alike in their functions and what attributes of network communication they are responsible for among the most standardized of architectures.

It is known to the inventor that a plurality of physical interfaces (ports) of a router may be logically bound together or aggregated to form a bond. A bond as known to the inventor is defined as an aggregation of layer 2 link addresses, which share a single layer 3 address and are considered in terms of layer 3 protocols as a logical or virtual interface. For example, two or more separate communication lines of a router can be seen in the network layer 3 as one large trunk. One advantage of establishing a bond is that layer 3 is not aware whether a given logical address defined in layer 3 is an aggregation of layer 2 links or is simply a single physical address. In this way, layer 3 protocol only has to consider a single logical address for routing purposes, and does not need to table every physical link address aggregated under the layer 3 address. As a result, routing is more efficient. The lowest layer (1) resolves all address hierarchies into a same-level list of physical interfaces or ports.

It has occurred to the inventor that more efficiency in routing could be achieved with respect to creating bonds comprising multiple router links by introducing a concept of hierarchy concerning bond assignment as well as flexibility of assignment and manipulation of bonds and bond structures.

Therefore, what is clearly needed is a method for creating and managing bonds that enables more hardware-controlled processing, less software-controlled processing, and provides more administrative flexibility with respect to changing bond assignments. A method such as this would make Layer 3 processing more efficient and improve load-balancing capability in data routing.

SUMMARY OF THE INVENTION

In a preferred embodiment of the present invention, in a communication system having a plurality of physical communication ports, a hierarchical bond communication interface is provided, comprising a logical interface as a component of the bond at a top level of the hierarchy, and a first subjugate logical interface at a second level of the hierarchy as a component of the top-level logical interface.

In some embodiments of the hierarchical bond components at the top level and the second level comprise one or more physical interfaces. There may also be more than two levels. Further, one or more physical interfaces may be elements of one or more levels. The communication system in a preferred embodiment is data router in a data packet network, and the network may be the well-known Internet network.

In another aspect of the invention, in a communication system having a plurality of physical communication ports, a method for grouping ports in data routing is provided, comprising the steps of (a) defining a logical interface at a top level of a hierarchical bond; (b) defining a first subjugate logical interface at a second level of the hierarchical bond as an element of the top-level logical interface; and (c) routing data by addressing the top-level bond, which then uses logical and physical components of the hierarchy for data transmission.

In some embodiments components at the top level and the second level comprise one or more physical interfaces. Further the bond may be of more than two levels. Still further, one or more physical interfaces may form a part of one or more levels of the hierarchical bond. In a preferred embodiment the communication system is a data router in a data packet network, which may be the well-known Internet network.

In yet another aspect of the invention, in a communication system having one or more hierarchical bonds comprising a logical interface at a top level and a first subjugate logical interface at a second level of the hierarchical bond as an element of the top-level logical interface, a control system for managing links in data routing is provided, comprising a first portion recording availability status of the hierarchical bonds for routing of data by monitoring characteristics of both logical and physical component links of the hierarchical bonds, and a second portion providing configuration input for use in the monitoring by the first portion.

In a preferred embodiment one or more thresholds are configured for an interface characteristic through the second portion for individual ones of the logical interfaces, a logical interface considered up or down according to the instant value of the characteristic for the interface in relation to the value of the configured threshold or thresholds. In some cases a threshold configured for a logical interface is an up threshold such that the logical interface is considered up if the instant value of the threshold characteristic for the logical interface has the configured relationship to the configured value of the up threshold, while in other cases a threshold set for a logical interface is a down threshold such that that the logical interface is considered down if the instant value of the threshold characteristic for the logical interface has the configured relationship to the configured value of the down threshold.

In some cases two threshold values differing in magnitude are configured for an individual one of the logical interfaces, one being an up threshold, and the other a down threshold, such that the logical interface may be considered up even though it no longer meets the configured relationship of the up threshold, but does not yet meet the configures relationship for the down threshold, or may be considered down even though the threshold characteristic for the interface no longer meets the configured relationship for the down threshold, but does not yet meet the configured relationship for the up threshold.

In operation in a preferred embodiment the first portion periodically evaluates the status of the hierarchical bonds for routing data by determining the up or down status of each bond, beginning with the lowest level in the hierarchy and proceeding upward to the highest level of the bond. In some cases the second portion comprises one or more of a graphical user interface (GUI), a control line interface (CLI), for configuring bond characteristics, or an SNMP interface for configuring bond characteristics. Further, the system may comprise a plurality of nodes each having a plurality of physical ports, wherein bonds are defined for individual nodes using the ports specific to the nodes, and the control system comprises a plurality of first portions each specific to an individual one of the nodes, and a common second portion providing configuration input to the plurality of nodes.

In certain cases the characteristic for thresholds associated with an interface is the up or down state of components of the interface, expressed as a number up or a number down. In other cases the characteristic for thresholds associated with an interface is a percentage of the number of components of the interface having an up or a down state, while in other cases the characteristic for thresholds is a fixed bandwidth value or a percentage of potential bandwidth.

In yet another aspect of the invention data router is provided, comprising a plurality of physical communication ports, at least one hierarchical bond having a logical interface as a component of the bond at a top level of the hierarchy, and a first subjugate logical interface at a second level of the hierarchy as a component of the top-level logical interface, the bond comprising at one or more levels one or more of the physical communication ports, and a control system for managing links in data routing, the control system having a first portion recording availability status of the hierarchical bonds for routing of data by monitoring status either up or down of both logical and physical component links of the at least one hierarchical bond, and a second portion providing configuration input for use in the monitoring by the first portion.

In some cases of the data router the at least one hierarchical bond comprises more than two levels. Further, the data router may be dedicated to a data packet network, and the network may be the well-known Internet network. In preferred embodiments data is routed by addressing the bond, which then uses logical and physical components of the hierarchy for data transmission.

In preferred embodiments one or more thresholds are configured for an interface characteristic through the second portion for individual ones of the logical interfaces, a logical interface considered up or down according to the instant value of the characteristic for the interface in relation to the value of the configured threshold or thresholds.

In some embodiments a threshold configured for a logical interface is an up threshold such that the logical interface is considered up if the instant value of the threshold characteristic for the logical interface has the configured relationship to the configured value of the up threshold. In other embodiments a threshold set for a logical interface is a down threshold such that that the logical interface is considered down if the instant value of the threshold characteristic for the logical interface has the configured relationship to the configured value of the down threshold.

In some embodiments two threshold values differing in magnitude are configured for an individual one of the logical interfaces, one being an up threshold, and the other a down threshold, such that the logical interface may be considered up even though it no longer meets the configured relationship of the up threshold, but does not yet meet the configures relationship for the down threshold, or may be considered down even though the threshold characteristic for the interface no longer meets the configured relationship for the down threshold, but does not yet meet the configured relationship for the up threshold.

In some embodiments the first portion periodically evaluates the status of the hierarchical bonds for routing data by determining the up or down status of each bond, beginning with the lowest level in the hierarchy and proceeding upward to the highest level of the bond. Also in some embodiments the second portion comprises one or more of a graphical user interface (GUI), a control line interface (CLI), for configuring bond characteristics, or an SNMP interface for configuring bond characteristics. In certain embodiments the communication system comprises a plurality of nodes each having a plurality of physical ports, wherein bonds are defined for individual nodes using the ports specific to the nodes, and the control system comprises a plurality of first portions each specific to an individual one of the nodes, and a common second portion providing configuration input to the plurality of nodes. In some cases of the data router characteristic for thresholds associated with an interface is the up or down state of components of the interface, expressed as a number up or a number down. In other cases the characteristic for thresholds associated with an interface is a percentage of the number of components of the interface having an up or a down state. In still other cases the characteristic for thresholds is a fixed bandwidth value.

In embodiments of the invention taught in enabling detail below, for the first time a multi-level hierarchical bond structure is taught wherein there may be a logical interface as a component of another logical interface, and top-level interfaces may be controlled for routing according to monitored state of component interfaces.

BRIEF DESCRIPTION OF THE DRAWING FIGURES

DESCRIPTION OF THE PREFERRED EMBODIMENTS

Figure 1:
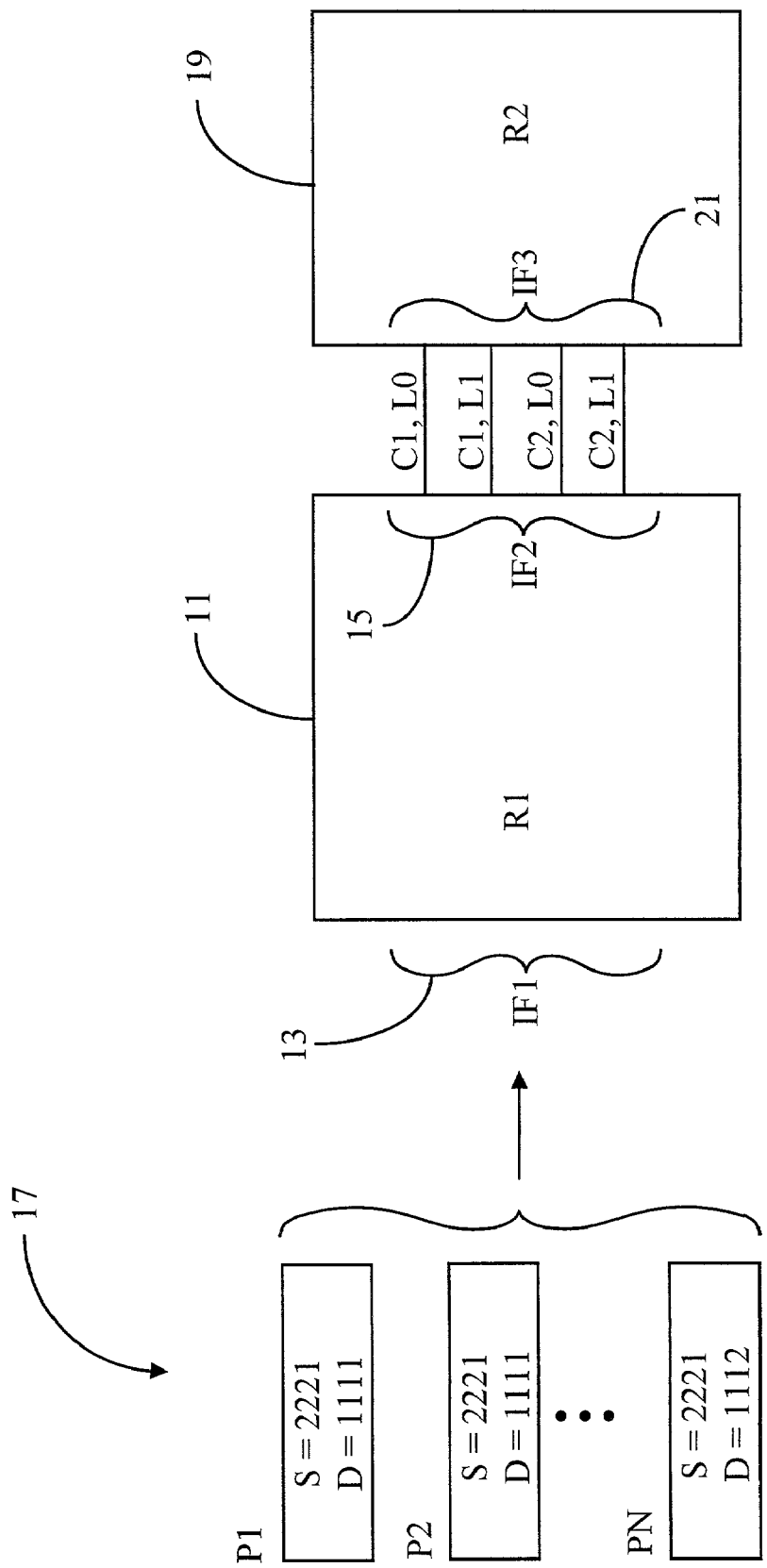
FIG. 1 is a block diagram illustrating packet processing in an embodiment of the present invention.

FIG. 1 is provided as an aid for describing the preferred embodiment of the present invention. In FIG. 1 a first router 11 is illustrated as having two logical interfaces. A first interface 13, labeled IF1 is considered as receiving data packets which will be processed and sent to an egress interface 15, labeled IF2. Incoming packets 17 are illustrated as each having a source and a destination header field (address). These are packets labeled P1 through Pn. Notice that in the illustration all of the packets represented have the same source address. Two of the packets have the same destination address, and one of the packets has a different destination address. All packets are shown as arriving at interface one of router R1, although there will typically be many more than one ingress interface. The same is true of egress interface IF2. That is, there will typically be many more than one egress interface, and most interfaces will act in both capacities. The internal interconnections and control functions managing these interconnections, known in the art as the internal fabric, is not shown. The simple schematic shown, however, is adequate for describing this embodiment of the present invention.

A second router 19, labeled R2, is shown as connected by four lines between an interface 21, labeled IF3, to interface IF2 at router one. In this example it is assumed that all packets received at IF1 will be routed on first hop to interface IF2 for egress. In some typical cases interface IF2 is a line card having four physical ports. It is not required, however, that a logical interface be limited to a single line card. In this particular example there are four physical ports associated with interface IF2, but these ports are on two cards C-1 and C2. The four lines between IF2 on router R1 and IF3 on router two are labeled card 1, line 0; card 1, line 1; card 2, line 0; and card 2, line 1.

It will be apparent to the skilled artisan that IP packets having a source and a destination address are not the only packets that will typically be received and forwarded by a router such as router R1. There may also be other packets, such as MPLS packets having labels rather than source and destination addresses, and such packets may also be routed in embodiments of the present invention, and this operation will also be described below. Routing of IP packets, however, is sufficient to describe practice of the present invention in this preferred embodiment.

Figure 2:
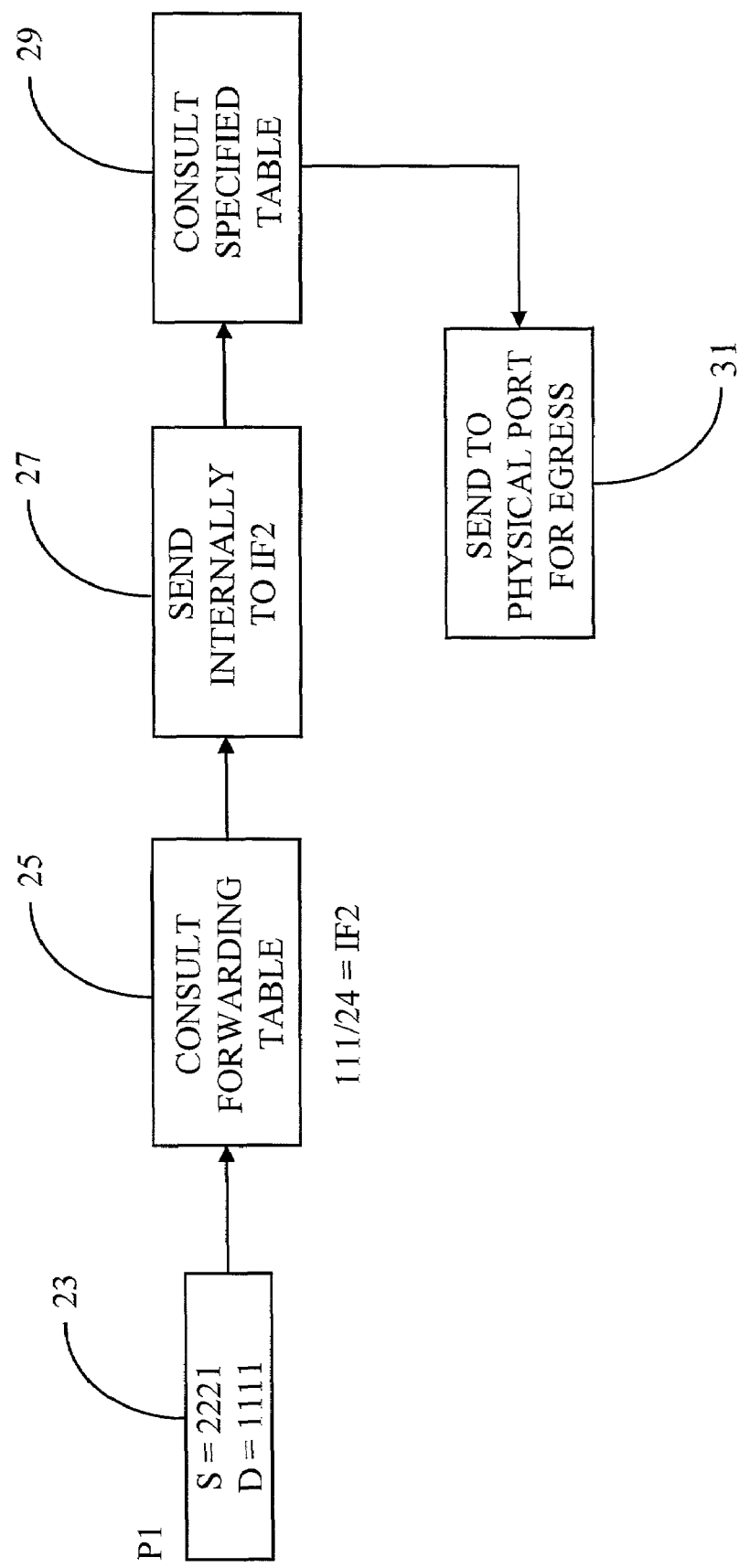
FIG. 2 is a logic flow diagram illustrating packet transfer steps in the prior art.

FIG. 2 is a simplified flow diagram showing a first packet 23 being conducted to a physical egress port according to current art. Firstly, the system of router R1 notes the destination address, and consults a forwarding table. The forwarding table may have a number of logical destinations suitable for the destination address of this first packet. A process termed "longest prefix match" is typically used to select the most suitable first hop destination. In this case the table lookup indicates a first stop destination for interface IF2. At step 27 the system of router R1 sends the packet to interface IF2. At this point the question of the correct physical egress port is still unanswered. One solution in the prior art is to do a second table lookup from a specialized table, which relates to all of the physical ports associated with interface IF2. This operation is shown as step 29. As a result of the second lookup the packet is sent to the finally selected physical port.

The process described above with the aid of FIG. 2 is software intensive, and is not a good solution for new, high-speed, routers. The present inventors propose and teach herein apparatus and method for routing such packets directly to physical egress ports in a manner that assures a rigid physical path for IP packets having a common source and destination address, and which are therefore part of the same flow. The apparatus and method of the invention also accomplishes efficient load balancing.

Figure 3:
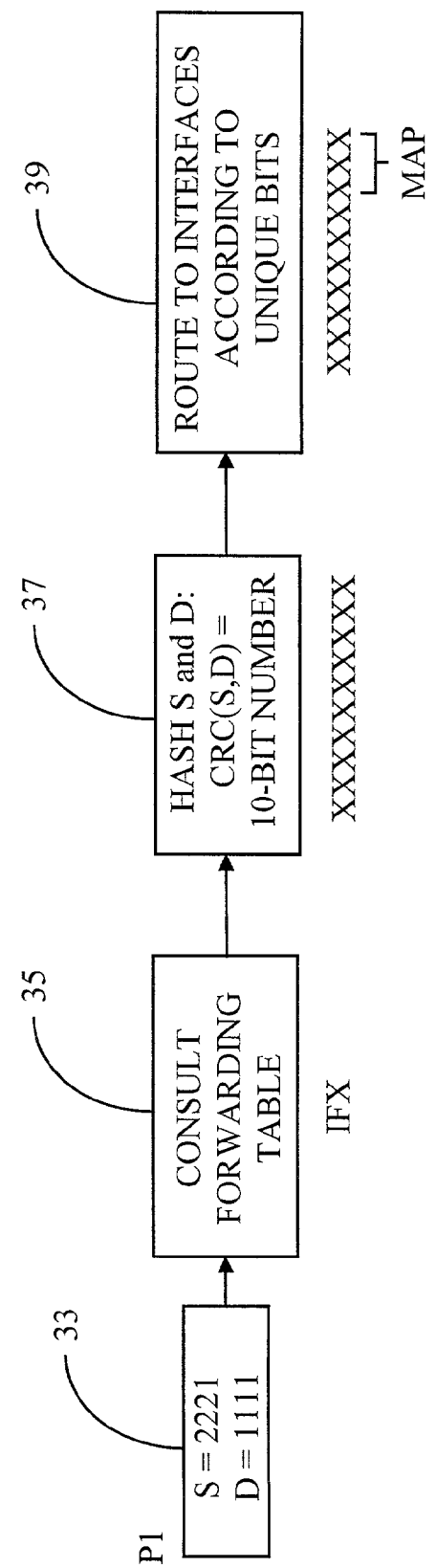
FIG. 3 is a flow diagram illustrating packet processing in an embodiment of the present invention.

FIG. 3 is a simplified flow diagram illustrating routing directly to physical interfaces according to a preferred embodiment of the present invention. An arriving packet, in this case packet P1, is shown at step 33. At step 35 the destination address is used in conjunction with the forwarding table to determine the logical interface for the first hop, as in the prior art example above. The result in this case the shown as IFx. Now the system of the invention, at step 37, performs a hashing function using both the source and the destination addresses. There are in the art a number of functions that might be used. One such function is known in the art as a CRC function. In this example a CRC-10 function, CRC meaning cyclic redundancy check, is used with both the source and destination address to produce a unique 10 bit number. The unique 10 bit number is shown as a string of x's below step 37. As the physical mapping of physical ports to logical ports is known, at this point the system knows the number and identification of the physical ports associated with the logical port determined by the forwarding table lookup at step 35. For the present example these are the four ports shown for IF2 and FIG. 1. For four ports only two bits of the unique 10 bit number from step 37 are needed. In this example the least significant two bits are used. This is a convenience, as any two bits could be used. One physical port is associated with each combination of the two selected bits, and the packet is sent to the physical port associated by the two selected bits.

It will be apparent to the skilled artisan that the system described with reference to FIG. 3 could map a great number of physical ports to each logical interface. It will also be apparent that every packet having the same source and destination address pair will be sent to exactly the same physical egress port. Reordering problems due to common packets taking variant physical paths are now completely eliminated. Assuming also that the physical ports each have the same transmission capacity, efficient load balancing is also accomplished. These assumptions are particularly convenient for one situation well-known to the present inventors. This is a situation where the logical interface may be a line card having four physical ports, with each port having the same transmission capability. In this situation the physical port mapping may be conveniently implemented largely in hardware on the line card.

There are, of course, situations wherein physical ports mapped to logical interfaces will not each have the same transmission capacity. The simple solution in this case is to provide more bits in the result of the hashing function for those physical ports that have higher capacity. For example, in a case of a logical interface having four physical ports, three of which are 2.5 gigabit ports, and one of which is a 10 gigabit port, one would need seven unique mappings. One would therefore need to use three bits of the 10 bit hashing result (capable of identifying up to eight unique mappings) to map packets among the four ports. One unique combination of the three bits would be assigned to each of the 2.5 gigabit ports, and four unique combinations of the three bits would be assigned to the 10 gigabit port. One might make an analogy of buckets into which packets are dumped according to the processing of this embodiment of the invention. In this case there are seven 2.5 gigabit buckets, four of which are assigned to the 10 gigabit port, and one bucket is assigned to each of the 2.5 gigabit ports. The result is still that IP packets with unique source/destination address pairs are routed by unique physical paths, and efficient load balancing is still accomplished.

In this example of four bits and seven destinations, there is a bit pattern left over, and, since the destination is selected by the result of the hashing function in the four bits, there needs to be a destination for the eighth bit combination (every packet has to have a destination). In this case a good choice is to map the eighth combination to the 10.0 gigabit port (which now has five bit combinations), to provide a good approximation for load balancing.

There are alternatively a number of ways the mapping may be done. In the case where the number of choices is a power of 2, the binary bits solution works very well. If there are fewer choices than the number of bit combinations, then the otherwise unused combinations need to be mapped to redundant destinations, as was described above for four bits (eight combinations) and seven physical destinations. For better approximation, one may use additional bit(s) and assign the right fraction of their values to each port.

In an alternative embodiment a mathematical division is required, where the hash value is divided by the number of choices (already weighted as shown above to reflect ratio of speeds) and the remainder is used to select a choice. This gives a more precise allocation of packets. In yet another embodiment there may be some other approximation of division, using any approximation of division or remainder known in the art.

Figure 4:
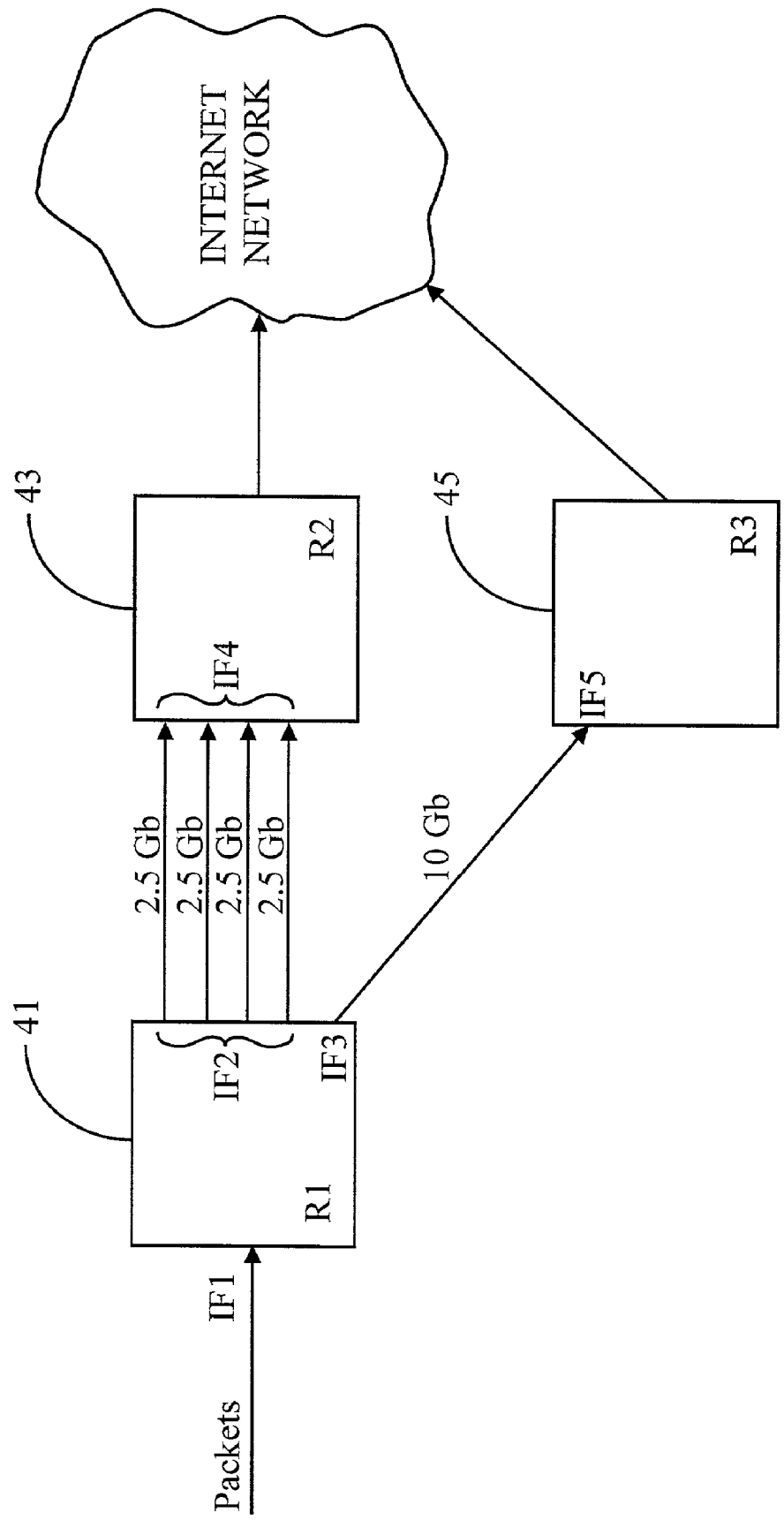
FIG. 4 is a block diagram showing a configuration in an embodiment of the present invention.

In another aspect of the invention, shown schematically in FIG. 4, there may be a choice to be made between two logical interfaces at the same router, and the two or more interfaces may connect to the same or two different downstream routers. In FIG. 4 a first router 41 as a logical interface IF1 receiving packets and two egress interfaces IF2 and IF3 are shown. IF2 connects by four lines to IF4 at a second router 43, and each of these lines has a 2.5 gigabit transmission capacity. IF3 connects by a single 10 gigabit capacity line to a third router 45 at interface IF5.

In this example the forwarding table regards IF2 and IF3 as exactly equal, and the longest prefix match returns both IF2 and IF3. The solution in this case is similar to the solution described above for one logical interface having physical ports of differing capacity. It is necessary in this case to accomplish the hashing operation prior to packets reaching the egress interfaces. In this case the solution requires eight buckets, which can be accomplished by three bits of the unique 10 bit hashing result. Four buckets are assigned to IF3, and four more buckets, one each to the four physical ports associated with IF2. This is a solution applicable to equal cost routing.

Figure 5:
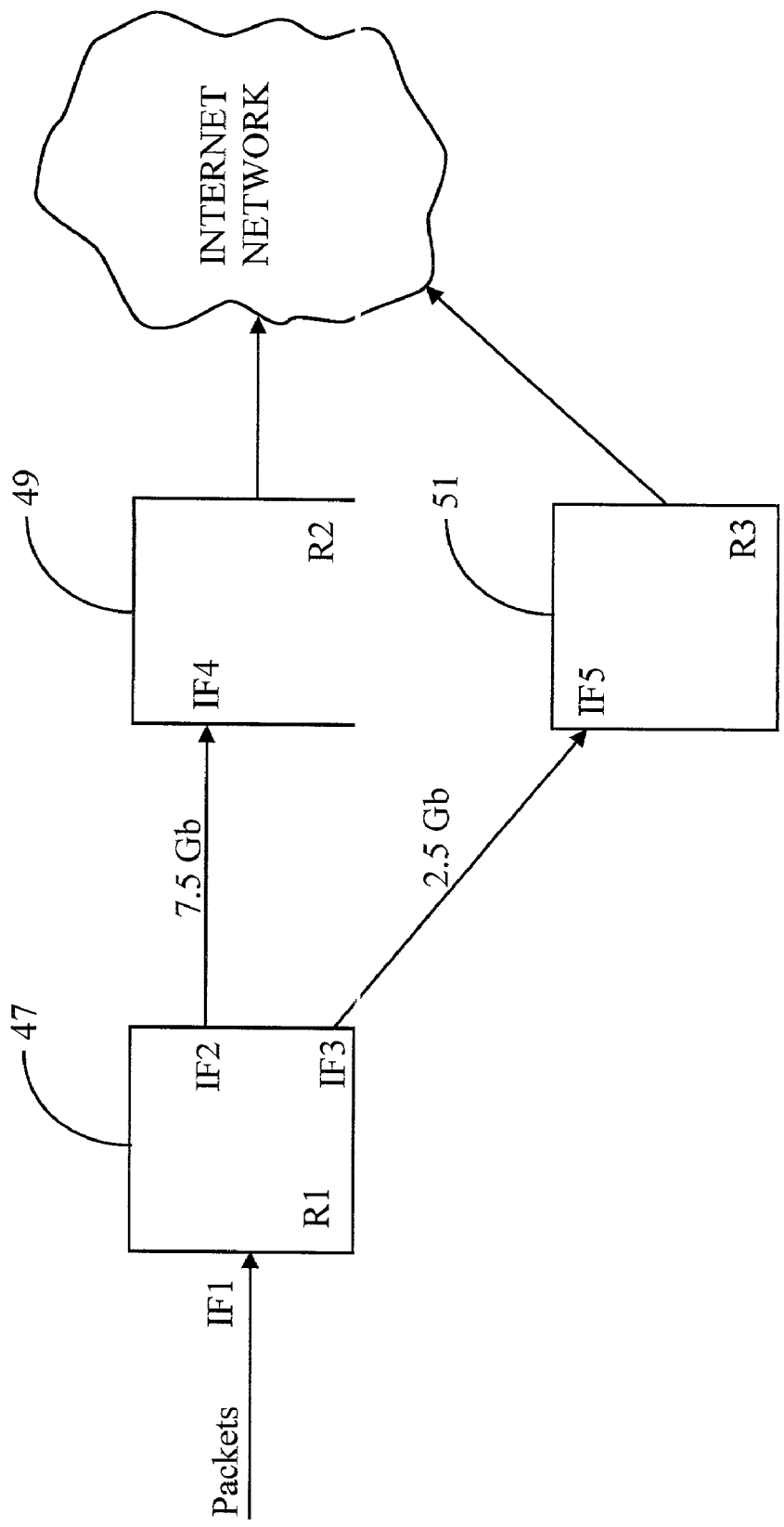
FIG. 5 is a block diagram showing another configuration in an embodiment of the present invention.

In a situation involving non-equal cost routing, a shown in FIG. 5, embodiments of the present invention are still applicable, and still provide latency solution and load balancing. In FIG. 5 a first router 47 has in ingress interface IF1 and two egress interfaces IF2 and IF3. IF2 connects by a 7.5 gigabit line to an interface IF4 at a second router 49. IF3 connects by a 2.5 gigabit line to a third router 51. The solution in this case requires four buckets representing 2.5 gigabit capacity each. Three of the buckets are dedicated to the 7.5 gigabit line between routers 47 and 49, and one bucket is dedicated to the 2.5 gigabit line between router 47 and router 51. The latency solution and load balancing solution are still intact.

Figure 6:
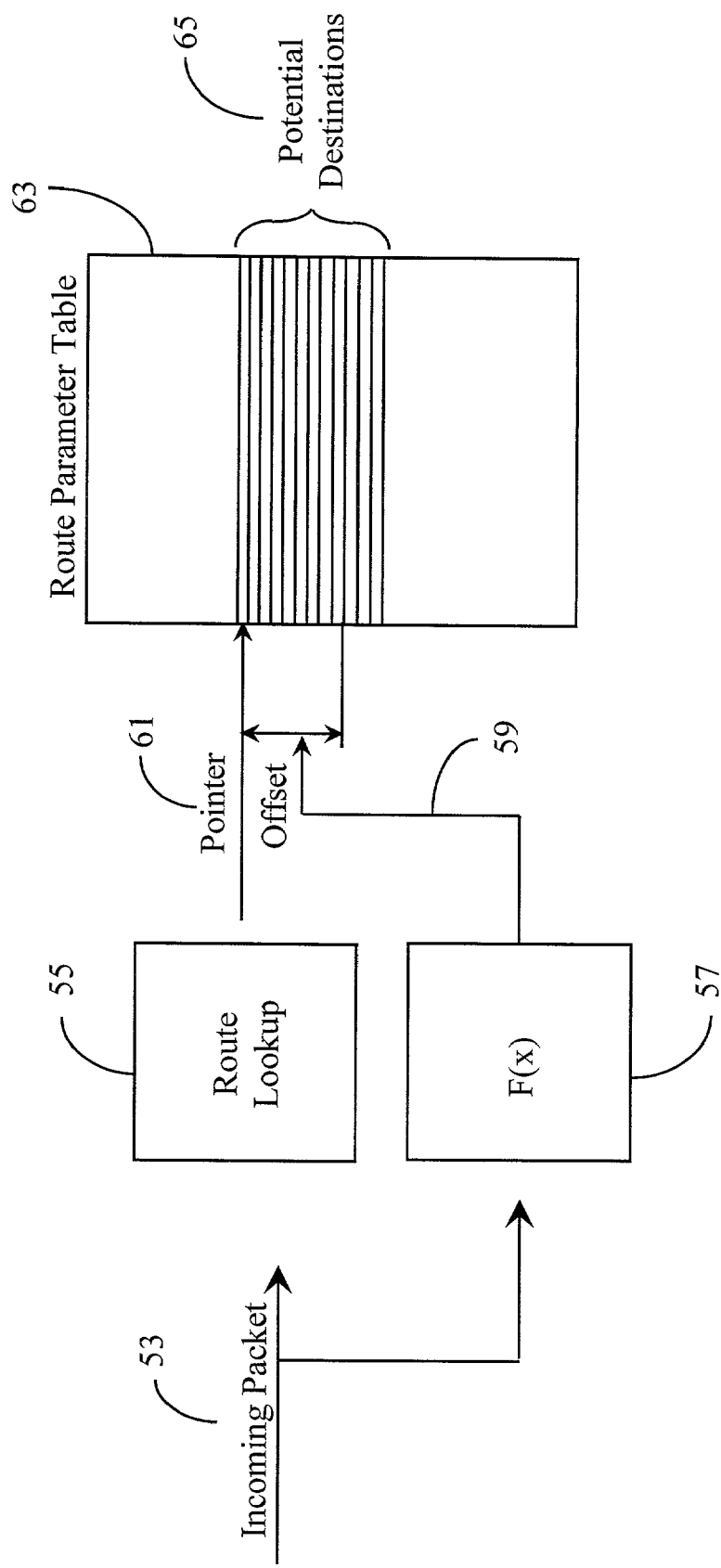
FIG. 6 is a schematic diagram illustrating practice of the present invention in a preferred embodiment.

There are a wide variety of arrangements of hardware and software that may be used in practice of the present invention, which is useful to select a physical port among a plurality of physical ports to which a packet may be routed in a router. FIG. 6 is a schematic diagram illustrating practice of the invention in one preferred embodiment. In this example an incoming packet 53 triggers a routing process, as is common in any router. Element 55 in this diagram represents a route lookup. In conventional routers this lookup determines the final destination for an incoming packet.

In routers under development at the time of the present patent application by the present inventors and others, a route lookup as represented by element 55 in FIG. 6 may be used to select a set of potential destinations for a packet in process, rather than a single destination. There may be, for example, several physical ports to which a packet may be sent, all more-or-less equivalent. The route lookup is typically done by a mapping of final destination address for a packet to an updated route table, which associates internal egress ports with final destinations.

In this example potential egress ports are represented in a route parameter table, and the lookup at 55 produces a pointer 61 to a first port in a set 65 of potential egress ports. Set 65 of potential egress ports in table 63 is but one of a plurality of such sets listed sequentially in the parameter table. By default, the lookup 55 produces a pointer to the first one of the ports in the set.

In the processing of incoming packet 53, certain addresses or labels, typically accompanying the packet as header fields, are, in a preferred embodiment of the invention, acted upon by a common function shown as F(x) in element 57. This function may be a hashing function. All or a portion of the result of the application of F(x) is then used as an offset to pointer 61 to select one among the several ports in set 65 as a local destination for packet 53. For example, a hashing function may be used at process 57 to process a binary number that is the binary sum of the source and destination addresses of packet 53, producing a 32-bit binary result. By design, in this example, the most significant 4 bits of the processing result may be used as offset 59, added to pointer 61, to select one of the destinations of set 63 for the packet. Four bits provides an offset from 0 to 16 in numerical value. By default in the processing, if there are fewer than 16 different ports in set 65, some offsets values are mapped to more than one port.

It will be apparent to the skilled artisan that every packet arriving having a common flow (same source and destination), will, by this scheme, be routed by the same egress port, and that design in mapping may also be used for load balancing.

It will be apparent to the skilled artisan that the examples presented as embodiments of the present invention above are relatively simple, and in real routers there are many more interfaces and ports than those described herein. The simple schematics, however, presented herein are sufficient to describe the system and practice of the present invention. It is quite true that physical ports in routers may both transmit and receive packets, and inventors herein have described primarily one-way operation. This is a convenience only, and not a limitation the invention. The method may also be generalized to the case of MPLS packets for which hashing may be done on, for example, the top label or the top two labels, and for any case of such packets being routed and apportioned to equipment and elements of equipment having different traffic capacity.

Hierarchical Bonds

In one aspect of the present invention a method is taught for establishing and manipulating bonds as hierarchical structures wherein granular manipulation through administration is enabled.

Figure 7:
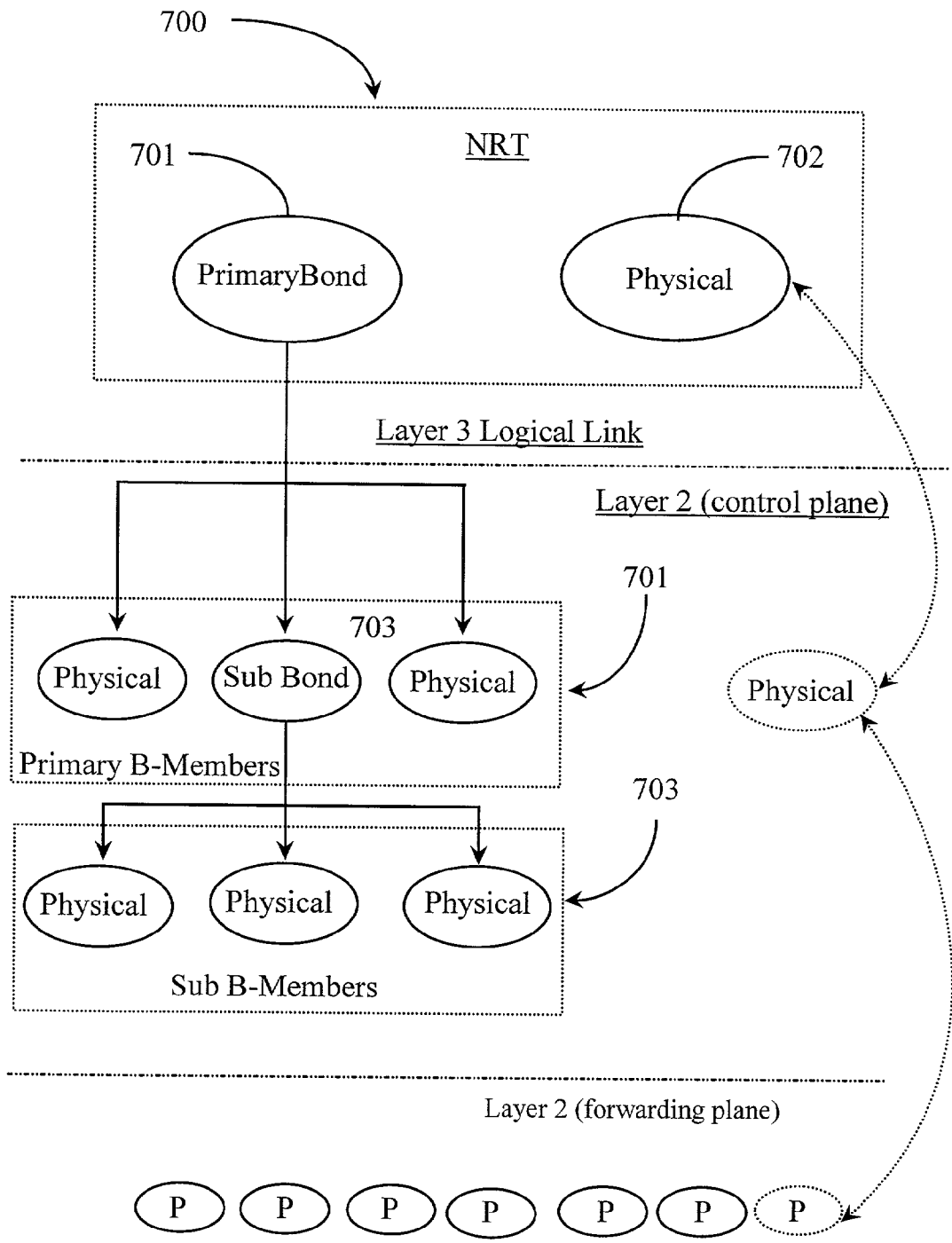
FIG. 7 is a tree diagram illustrating the logical construction of a hierarchical bond according to an embodiment of the present invention.

FIG. 7 is block diagram illustrating the logical construction of a hierarchical bond structure according to an embodiment of the present invention. A network routing table (NRT) 700 is illustrated as a part of a layer 3 attribute. NRT 700 is adapted to list and maintain updated states for all logical interfaces accessible and operational over a given network topology of interconnected routing nodes. In this simple example, there are but 2 logical interfaces illustrated, interface 701 and interface 702. In actual practice there would be many more logical interfaces listed. However, the inventor deems the illustration of 2 such interfaces sufficient for the purpose of explaining the invention.

Table 700 is a logical representation of a routing table according to layer 3 protocols concerned with packet routing through a data packet network as described above. Logical interface 701 is a bond, or aggregated interface. In this example it is a primary interface or primary bond as labeled. In this particular example, logical interface 702 represents a single physical link between routers (no aggregation). The attributes of logical interfaces 701 and 702, as far as being descriptive of a bond or single interface is transparent to layer 3 protocol. Layer 3 protocols see both interfaces as single interfaces or trunks. Addressing of logical interfaces 701 and 702 follows normal layer 3 protocols, typically a prefixed address.

Primary bond 701 (represented as a logical interface in Layer 3) is illustrated in Layer 2 (control plane) as a plurality of primary bond members (B-Members) enclosed in a dotted rectangle. There are 3 illustrated bond members comprising bond 701, one of these labeled a subjugate bond (S-bond) 703. S-bond 703 is illustrated broken-down below bond 701 as an aggregate of 3 physical links labeled S- B-Members (B denoting bond). S-bond 703 is a logical bond member of primary bond 701. In terms of bandwidth capacity, the primary bond member 703 comprises the sum of the bandwidth capacities of the physical links comprising S- bond 703. Likewise, primary bond 701 contains the sum of the bandwidth of 3 primary bond members (ports) 701 plus the sum of the bandwidth of the 3 S-bond members (703).

It is noted herein that logical interface 702 represents a real physical link defined in layer 2 wherein there are no aggregated links associated. Although link-state routing protocols such as OSPF or ISIS in layer 3 cannot distinguish that interface 701 is an aggregate of layer 2 data links (2 bond levels), they are aware of the bandwidth capacity of interface 701 and 702. Network administrators can use this aspect for such as load-balancing purposes and in dynamically rearranging and manipulating bond structures through control line interfacing for further optimization of network resources, which essentially is bandwidth.

The logical structure of logical interface 701 is visible in the control plane of layer 2 where bond structuring and manipulation occurs. In the forwarding plane of layer 2, the hierarchy visible in the control plane is stripped away, and all physical links are represented at a single level for the purpose of efficient data routing.

It will be apparent to one with skill in the art that, while it is known to aggregate layer 2 links to form a bond advertised in Layer 3 as a single trunk, it is not known to construct primary or superbonds visible in Layer 2, the primary or superbonds having one or more subjugate bonds established in a hierarchical tree. In multi-processor data routers known to the inventor, there are a large number of interfacing ports between the internal network of the router and the data network to which it is connected. By aggregating strategic numbers of these links and placing the aggregations (bonds) in a hierarchical structure, processor resources normally used for Layer 3 processing and messaging can be sharply reduced over single bond structural techniques. For example, a sub-bond may be advertised to its parent bond in some cases only when all of its sub-bond members are available for forwarding. In other cases there may be an intermediate state wherein a partial set of sub-bond members becomes available or non-available or hidden. Notification to the layer 3 entities is thus filtered/aggregated.

Further to the above, it is an object of the present invention to enable much more administrative control over bond management than is currently available in the art. Such control capability includes on-the-fly configuration capabilities through control line interfacing. Such capabilities include adding and deleting bond members, restructuring hierarchical bonds in terms of desired hierarchies, and creating new bonds as well as deleting old bonds that are no longer useful. In essence, network load balancing can be greatly improved by responding to network conditions through bond management as taught herein.

Figure 8:
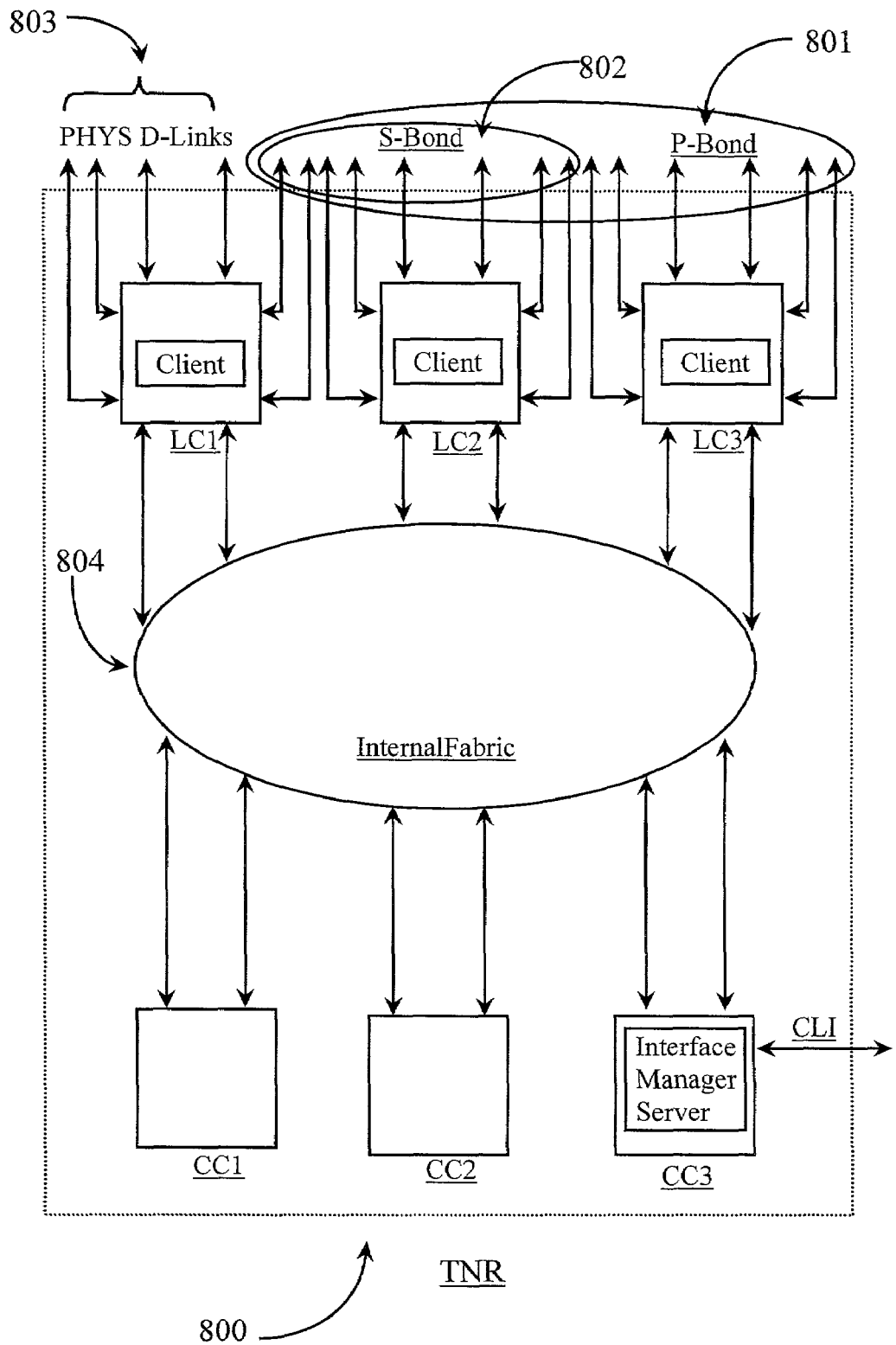
FIG. 8 is a block diagram illustrating a hierarchical bond assignment and implementation mechanism in a distributed processor router according to an embodiment of the present invention.

FIG. 8 is a block diagram illustrating a hierarchical bond assignment and implementation mechanism in a distributed processor router 800 according to an embodiment of the present invention. Router 800 is a terabit network router (TNR) known to the inventor. Hereinafter in this specification, router 800 may be referred to as TNR 800.

TNR 800 comprises three types of distributed processor elements. These are line cards, illustrated herein as LC1, LC2, and LC3, control cards illustrated herein as CC1, CC2, and CC3, and fabric cards represented logically as internal fabric 804.

In general, line cards are externally-facing components having a processor and multiple data ports for data communication that are adapted as line interfaces between the internal components of TNR 800 and other routers and equipment external to TNR 800 operating on the external network. They may be thought of as a plurality of distributed network interfaces.

Internal Fabric 804 comprises a plurality of distributed processor-equipped cards each having multiple data ports for data communication, that are adapted to form an internal data packet network of interconnected nodes serving as an internal routing fabric for data and control messaging. Control cards are distributed processor elements each having multiple data ports for data communication that are adapted as configuration, data communication, and routing controllers managing the ongoing functions of both line and fabric cards. Control cards are responsible for distributing boot, port configuration, state information, and protocol configuration to appropriate line and fabric cards under their control. In this example, a single CC labeled CC3 is responsible for bond configuration and management via an Interface Manager (IFM) Server. The IFM server is not limited to a single control card, and may operate on any one, or be distributed or redundantly implemented over or on a plurality of CCs.

In this example, data links are illustrated as double arrowed lines emanating from LCs 1-3 and progressing out of TNR 800. In this exemplary diagram each representative LC has six bi-directional data ports established for network interface. It is noted herein that each data port is bi-directional and can serve ingress and egress data traffic. A series of links are illustrated between LCs 1-3 and internal fabric 804. These links are intended to logically represent communication capability of LCs through internal fabric 804. For example, data traffic may come into TNR 800 on LC1, be routed through internal fabric 804, and egress TNR 800 from LC 3.

A primary bond (P-bond) 801 is illustrated in this example as an aggregation of 14 data links. Six data links of P-bond 801 are ported to LC 3. An S- bond (S-bond) 802 is also illustrated in this example as an aggregation of seven data links. The seven links of the S-bond are seen as a single data link of the P-bond in layer 3. Five data links of S-bond 802 are ported to LC2. Two data links of S-bond 802 are ported to LC1. The overlap of illustrated ellipses defining P-bond and S-bond are intended to show that S-bond 802 is a Hierarchical member of P-bond 801. A single physical data link cannot be a member of two separate aggregations or bonds. In this example then, a hierarchical bond tree comprising P-bond and S-bond spans all three illustrated line cards. The remaining 4 physical data links (PHYS D-Links) 803 ported to LC1 are not bond members and are represented in Layer 3 protocol as four distinct interfaces or trunks. P-bond 801 is represented in Layer 3 protocol as one distinct interface or trunk.

In order to enable configuration and assignment of a data link ported to a line card as a bond member, a protocol server application is provided in this example on one of the control cards. In this particular example, the IFM Server is provided on CC3. An external data link to a control line interface (CLI) illustrated herein as a double arrow emanating from CC3 and progressing out of TNR 800 provides administrative interface. Each LC 1-3 has a protocol client (Client) provided thereon for communicating with the Server established on the CC3. This server/client relationship provides the management capabilities for establishing bonds, adding or deleting bond members, reassigning bond hierarchy, breaking up established bonds, and so on. The IFM server on CC3 distributes all the required information to each Client on LC 1-3 to implement bond assignment and configuration, link state protocol, and any other data required to manage link operation pertinent to the included links on each card. Commands exist for bond member add, bond member delete, bond create, bond delete, and bond re-assignment in a preferred embodiment.

Administrators may effect commands through CLI interface on-the-fly to effect efficient load balancing for Layer 3 routing. Some states of bonds and members are affected by preset thresholds set by administrators that define whether a Primary bond or S- bond is considered operational from the viewpoint of Layer 3 routing protocol. More detail about this process is described below.

Figure 9:
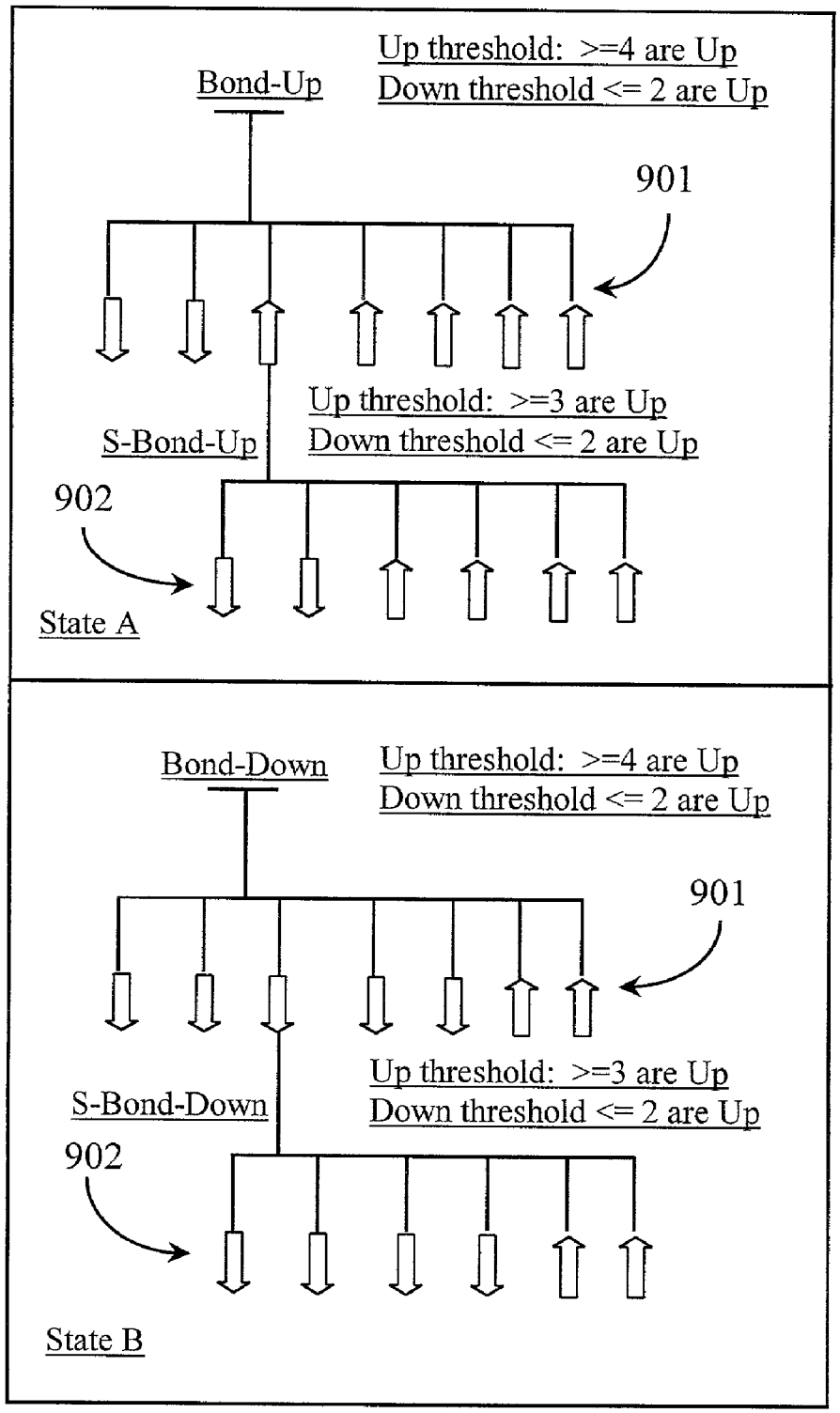
FIG. 9 is a logical chart illustrating various states and conditions in a hierarchical bond.

FIG. 9 is a logical chart illustrating various states and conditions for a hierarchical bond. There are 2 illustrated bond states in this example for a single hierarchical bond, State A and State B. The exemplary hierarchical bond comprises a primary bond 901 having seven data links, one of which is an S-bond 902 comprising six data links. Bond-up means that the representative logical interface advertised in Layer 3 is operationally up according to available bandwidth conditions that are preset by operational threshold and only visible in data link layer 2. A plurality of block arrows represent separate data links and the diagram, and the up or down direction of each arrow indicates whether a link has available bandwidth or not.

bonds are considered in Layer 3 to be Up or Down according to the Up or Down state of the individual links that make up the bond, whether P bond or S-bond. In a preferred embodiment two different thresholds are set for change-to-up and change-to-down. That is, for a bond that is Down to be considered Up the number of Up links in the bond has to meet an Up threshold. Then the status will be considered Up, even if the number of Up links falls below the Up threshold, until the number of Up links falls to or below a lower threshold, which is the Down threshold. After then considered down, the status will stay Down, even if the number of Up links increases above the Down threshold, until that number again meets the Up threshold.

The point of the different thresholds providing a margin, is that sometimes links go unstable, and may rapidly change from Up to Down. The margin in thresholds allows for this instability without causing the bond state to reflect the same instability.

In FIG. 9, in the upper illustration, the Primary bond 901 is Up because the number of Up links is five, exceeding the Up threshold, which is set for greater than or equal to 4. The primary bond will continue as Up until and unless the number of Up links falls to the Down threshold of <=2 being Up. That is, two of the five Up links may go down, leaving three Up (less than the four for the Up threshold, and the bond will remain in Up status, until one more link goes down.

Sub-bond 902 has six links, with four in Up state as shown. The S-bond is therefore considered Up, and shown as Up in the P-bond, because the four Up links satisfy the >=3 threshold. If one link fails, still considered Up, if another fails, considered Down. In the case of the S-bond there is no margin, but also no overlap.

The lower portion of FIG. 9 illustrates the same P-bond and S-bond with the same thresholds, but with the S-bond down, and the P-bond also down. Given the above description, the skilled artisan may deduce the state by the illustration of Link states.

Figure 10:
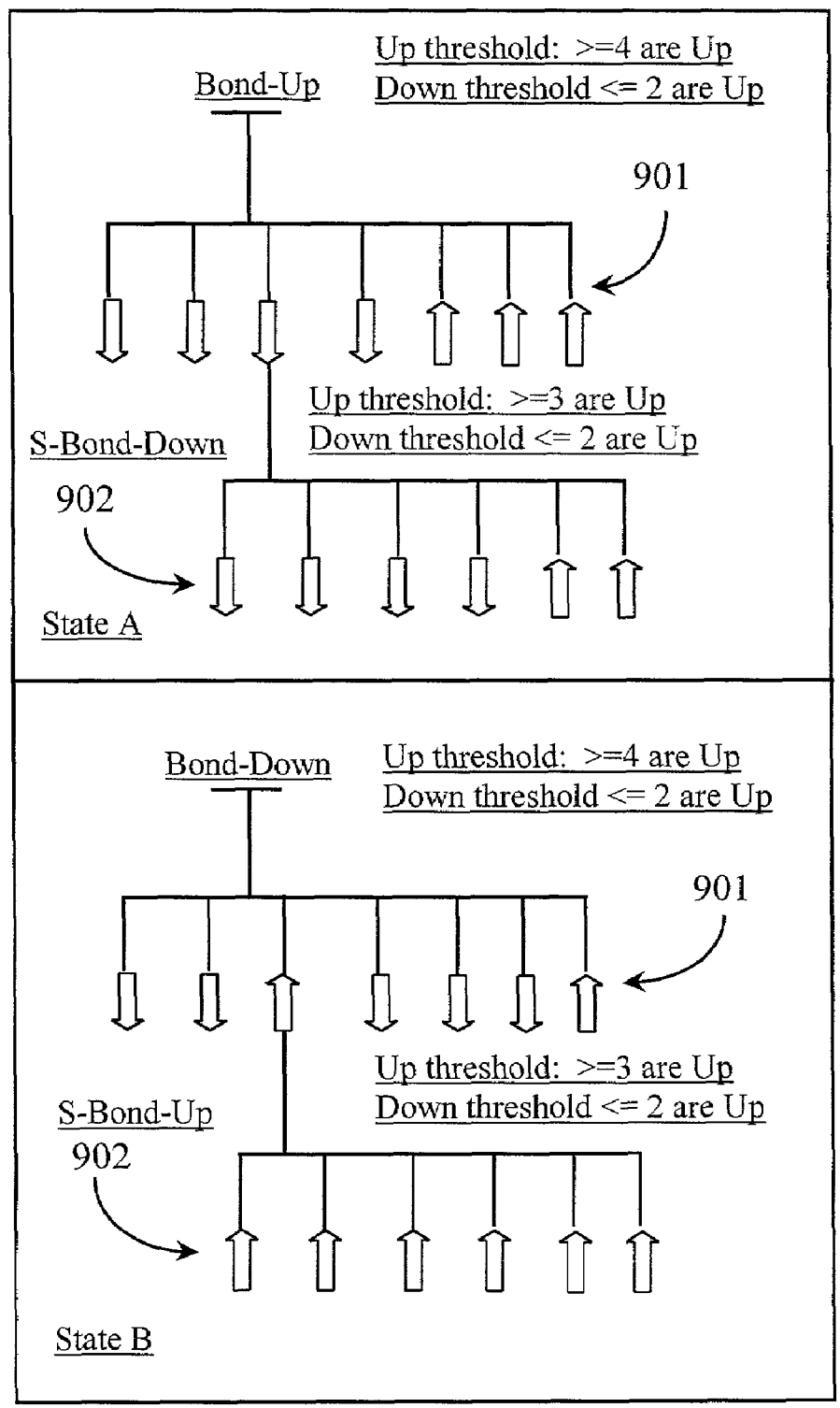
FIG. 10 is a logical chart illustrating further possible states and conditions in a hierarchical bond.

FIG. 10 is a logical chart illustrating further possible states and conditions in a hierarchical bond. This example illustrates another State A and State B view of the same Hierarchical bond structure described above with reference to FIG. 9. In State A of FIG. 10, P-bond 901 is considered operationally Up and S-bond 902 is considered operationally Down according to the current states of involved bond members following the same threshold rules discussed with reference to FIG. 9 above. Even though the three Up links of P-bond 901 are less then the Up threshold, it may be inferred that the Up threshold had been met at four, and one link has since failed, leaving the P-bond still above (in terms of Up links) the Down threshold value of <=2 being Up.

So the logical interface visible in Layer 3 for P-bond 901 is considered operationally Up, however the amount of bandwidth represented by S-bond 902 is not available for routing purposes, because S-bond 902 is now considered Down (only two links are Up). The amount of current bandwidth visible to Layer 3 protocol is limited to the sum of the 3 bond members of bond 901 that are illustrated as operationally Up. An administrator can increase bandwidth to the represented logical interface defined in layer 2 by the hierarchical bond structure of bond 901 and 902 by adding operationally Up bond members to trigger state change.

Referring now to State B in FIG. 10, P-bond 901 is considered operationally Down (only two links Up, one of which is S-bond 902). S-bond 902 is considered operationally Up, as all six component links are Up. In terms of layer three protocol, the represented logical interface is entirely unavailable for routing purposes in this case even though a significant amount of unused bandwidth is available over the six operationally up members of S-bond 902. In this case, an administrator may consider reassigning S-bond 902 as a primary bond, or perhaps reassigning it to another existing bond structure. Bond management at a hierarchical level wherein there may be many P-bond and S-bond structures enables fewer represented logical interfaces for Layer three consideration and fewer messages between Layer two and Layer three. The overall effect is improved efficiency in routing and load balancing. For example, a logical interface that comprises a bond hierarchy will be slower to oscillate from Up to Down State.

It should be noted that other units of threshold are possible than the exemplary thresholds of individual links being Up or Down. For example, (a) bandwidth in bits per second, or (b) fraction or percentage of total capacity (total capacity is computed as the bandwidth available when all members of a bond are UP). Such alternative units can be especially useful when managing bonds whose members have different bandwidth capacity.

Ideally, as bond members in lower levels of hierarchy go down, the only reflection in Layer 3 is that of a diminished amount of bandwidth associated with a particular logical interface comprising the bond structure. Alternate interfaces are then chosen for routing, taking pressure off of the bond members of the logical interface at the lower levels (Layer 1 and 2). When the members begin coming back up, more bandwidth is advertised in Layer three for the interface. Again, structures already built that for some reason are not operating in an ideal fashion can be reorganized and manipulated to compensate.

Figure 11:
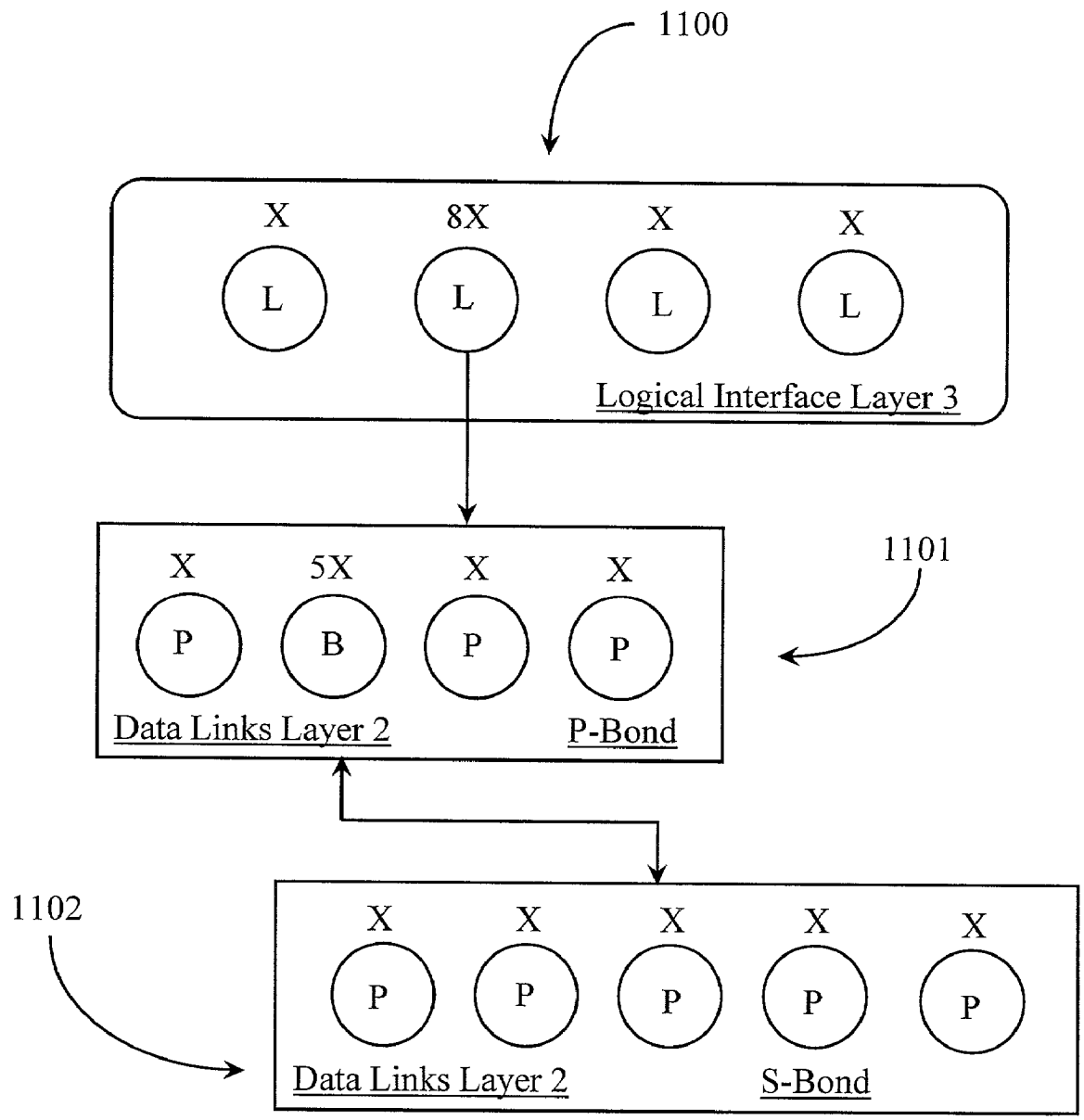
FIG. 11 is a block diagram illustrating bandwidth associations in a bond tree according to one embodiment of the present invention.

FIG. 11 is a block diagram illustrating bandwidth associations in a bond tree according to one embodiment of the present invention. In this example, a representation of network Layer three NRT 1100 is illustrated as containing a list of logical interfaces represented by circles labeled with the letter L. The letter X associated with each logical interface in NRT 1100 is representative of a bandwidth amount associated with each interface at any given time. For example, the first L interface reading from left to right represents X bandwidth. The next L interface to the right represents 8X bandwidth. The remaining two interfaces to the right represent X bandwidth each. It is assumed in this example that every bond member in this hierarchy is Up and not being utilized, meaning that all of the represented bandwidth is available for routing. The L interface in NRT 1100 exhibiting 8X bandwidth is a P-bond, meaning the primary bond of the tree having at least one S-bond configured under it.

The L interface exhibiting 8X bandwidth is broken down in Layer two as P-bond 1101 containing four B-members, one of which is a S-bond. Reading within box 1101 from left to right, a physical (P) link is the first B-member, an S-bond exhibiting 5X bandwidth and labeled B for bond is the next bond member of P-bond 1101 The remaining three B-members are physical links of X bandwidth each. The S-bond (B) within box 1101 is further broken down as S-bond 1102 comprising, in this case, five physical (P) links each having X bandwidth capacity. Because S-bond is the lowest bond in the hierarchy of this example, there are no further links to consider in the tree. Referring now back to FIG. 8, much messaging from Server to Client will be automated based on triggered thresholds. However, CLI interfacing provides granular administrative control. In a preferred embodiment, one CC, IFM in this example, is adapted to control distribution of updates regarding interface state. It is important to note herein that the mechanism of bond management comprising one Server and multiple Clients is integrated with Automatic Protection Switching (APS) and Multi-protocol Label Switching (MPLS) capabilities.

It will be apparent to one with skill in the art that there may be many more CCs and LCs and ports supported by TNR 800 than are illustrated in this example without departing from the spirit and scope of the present invention. In one embodiment, CLI interfacing may be used to administratively bring down certain bond-enabled LCs during router operation in order to re-configure bond hierarchical structures and interfaces such that when booted back up by GMCC, the new structures are implemented and appropriate replacement data is propagated for Layer 3 consideration in data routing.

The method and apparatus of the present invention may be practiced over an Internet network including any sub-networks. Corporate and private WANs may also be enhanced to practice the invention. Moreover there are a variety of known routing protocols and network configurations that are supported. Examples include Ethernet, ISIS, ESIS, OSPF, BGP,POS, CLNP, IPX, Token Ring, and many other network regimens and protocols.

The method and apparatus of the present invention should be afforded the broadest possible scope under examination. The invention must therefore be accorded the entire breadth of the claims, which follow:

What is claimed is:

1. In a communication system having a plurality of nodes each having a plurality of physical communication ports, a method for controlling and managing ports in data routing, comprising the steps of:
    (a) defining one or more hierarchical bonds for the individual nodes using the ports specific to the nodes comprising a logical interface at a top level of hierarchical bonds by grouping a plurality of ports;
    (b) defining a first subjugate logical interface at a second level of the hierarchical bond as an element of the top-level logical interface by defining a plurality of first portions each specific to an individual one of the nodes recording availability status of the hierarchical bonds for routing of data by monitoring characteristics of both logical and physical interfaces and data links of the hierarchical bond; and
    (c) defining a common second portion providing configuration input to the plurality of nodes for use in the monitoring by the first portion;
    (d) routing data by addressing the top-level bond, which then uses logical and physical ports and interfaces of the hierarchy for data transmission.

2. The method of claim 1 wherein components at the top level and the second level comprise one or more physical interfaces.

3. The method of claim 1 wherein the hierarchical bonds comprise more than two levels.

4. The method of claim 3 wherein one or more physical interfaces form a part of one or more levels of the hierarchical bonds.

5. The method of claim 1 wherein the communication system is a data router in a data packet network.

6. The method of claim 5 wherein the data packet network is the Internet network.

7. In a communication system a control system for managing links in data routing, comprising:
    a plurality of nodes each having a plurality of physical ports;
    one or more hierarchical bonds comprising a logical interface at a top level including a plurality of data links;
    a first subjugate logical interface at a second level of the hierarchical bond as an element of the top-level logical interface;
    a first portion recording availability status of the hierarchical bonds for routing of data by monitoring characteristics of both logical and physical interfaces and data links of the hierarchical bonds; and
    a second portion providing configuration input for use in the monitoring by the first portion;
    wherein bonds are defined for the individual nodes using the ports specific to the nodes, and the control system comprises a plurality of first portions each specific to an individual one of the nodes, and a common second portion providing configuration input to the plurality of nodes.

8. The control system of claim 7 wherein one or more thresholds are configured for an interface characteristic through the second portion for individual ones of the logical interfaces, a logical interface considered up having a determined amount of data links with sufficient bandwidth or down having a determined amount of data links with insufficient bandwidth according to a current threshold value of the characteristic for the interface in relation to the value of the configured threshold or thresholds.

9. The control system of claim 8 wherein a threshold configured for a logical interface is an up threshold such that the logical interface is considered up if the instant value of the threshold characteristic for the logical interface has the configured relationship to the configured value of the up threshold.

10. The control system of claim 8 wherein a threshold set for a logical interface is a down threshold such that that the logical interface is considered down if the instant value of the threshold characteristic for the logical interface has the configured relationship to the configured value of the down threshold.

11. The control system of claim 8 wherein two threshold values differing in magnitude are configured for an individual one of the logical interfaces, one being an up threshold, and the other a down threshold, such that the logical interface may be considered up even though it no longer meets the configured relationship of the up threshold, but does not yet meet the configures relationship for the down threshold, or may be considered down even though the threshold characteristic for the interface no longer meets the configured relationship for the down threshold, but does not yet meet the configured relationship for the up threshold.

12. The control system of claim 11 wherein the first portion periodically evaluates the status of the hierarchical bonds for routing data by determining the up or down status of each bond, beginning with the lowest level in the hierarchy and proceeding upward to the highest level of the bond.

13. The control system of claim 7 wherein the second portion comprises one or more of a graphical user interface (GUI), a control line interface (CLI), for configuring bond characteristics, or an SNMP interface for configuring bond characteristics.

14. The control system of claim 8 wherein the characteristic for thresholds associated with an interface is the up or down state of components of the interface, expressed as a number up or a number down.

15. The control system of claim 8 wherein the characteristic for thresholds associated with an interface is a percentage of the number of components of the interface having an up or a down state.

16. The control system of claim 8 wherein the characteristic for thresholds is a fixed bandwidth value.

17. The control system of claim 8 wherein the characteristic for thresholds is a percentage of potential bandwidth.

18. A data router comprising:
a plurality of physical communication ports;
at least one hierarchical bond having a logical interface as a component of the bond at a top level of the hierarchy defining a portion of the plurality of physical communication ports, and a first subjugate logical interface at a second level of the hierarchy as a component of the top-level logical interface further defining a portion of the physical communication ports defined at the top level of the hierarchy, and
a control system for managing links in data routing, the control system having a first portion recording availability status of the hierarchical bonds for routing of data by monitoring status either up or down of both logical and physical interfaces and ports of the at least one hierarchical bond, and a second portion providing configuration input for use in the monitoring by the first portion;
wherein one or more thresholds are configured for an interface characteristic through the second portion for individual ones of the logical interfaces, a logical interface considered up having a determined amount of data links with sufficient bandwidth or down having a determined amount of data links with insufficient bandwidth according to a current value of the characteristic for the interface in relation to the value of the configured threshold or thresholds.

19. The data router of claim 18 wherein the at least one hierarchical bond comprises more than two levels.

20. The data router of claim 18 wherein the data router is dedicated to a data packet network.

21. The data router of claim 20 wherein the data packet network is the Internet network.

22. The data router of claim 18 wherein data is routed by addressing the bond, which then uses logical and physical ports and interfaces of the hierarchy for data transmission.

23. The data router of claim 18 wherein a threshold configured for a logical interface is an up threshold such that the logical interface is considered up if the instant value of the threshold characteristic for the logical interface has the configured relationship to the configured value of the up threshold.

24. The data router of claim 18 wherein a threshold set for a logical interface is a down threshold such that that the logical interface is considered down if the instant value of the threshold characteristic for the logical interface has the configured relationship to the configured value of the down threshold.

25. The data router of claim 18 wherein two threshold values differing in magnitude are configured for an individual one of the logical interfaces, one being an up threshold, and the other a down threshold, such that the logical interface may be considered up even though it no longer meets the configured relationship of the up threshold, but does not yet meet the configures relationship for the down threshold, or may be considered down even though the threshold characteristic for the interface no longer meets the configured relationship for the down threshold, but does not yet meet the configured relationship for the up threshold.

26. The data router of claim 25 wherein the first portion periodically evaluates the status of the hierarchical bonds for routing data by determining the up or down status of each bond, beginning with the lowest level in the hierarchy and proceeding upward to the highest level of the bond.

27. The data router of claim 18 wherein the second portion comprises one or more of a graphical user interface (GUI), a control line interface (CLI), for configuring bond characteristics, or an SNMP interface for configuring bond characteristics.

28. The data router of claim 18 wherein the communication system comprises a plurality of nodes each having a plurality of physical ports, wherein bonds are defined for individual nodes using the ports specific to the nodes, and the control system comprises a plurality of first portions each specific to an individual one of the nodes, and a common second portion providing configuration input to the plurality of nodes.

29. The data router of claim 18 wherein the characteristic for thresholds associated with an interface is the up or down state of components of the interface, expressed as a number up or a number down.

30. The data router of claim 18 wherein the characteristic for thresholds associated with an interface is a percentage of the number of components of the interface having an up or a down state.

31. The data router of claim 18 wherein the characteristic for thresholds is a fixed bandwidth value.

* * * * *